(12) United States Patent
Choi

(10) Patent No.: US 9,389,753 B2
(45) Date of Patent: Jul. 12, 2016

(54) APPARATUS AND METHOD OF PROVIDING USER INTERFACE

(71) Applicant: SAMSUNG ELECTRONICS CO., LTD, Suwon-si (KR)

(72) Inventor: Song-ha Choi, Anyang-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 166 days.

(21) Appl. No.: 13/688,711

(22) Filed: Nov. 29, 2012

(65) Prior Publication Data

US 2013/0139108 A1 May 30, 2013

(30) Foreign Application Priority Data

Nov. 29, 2011 (KR) ......... 10-2011-0126382

(51) Int. Cl.
*G06F 3/0482* (2013.01)
*G06F 3/0488* (2013.01)
*G06F 3/0481* (2013.01)
*G06F 17/30* (2006.01)

(52) U.S. Cl.
CPC ........... *G06F 3/0482* (2013.01); *G06F 3/0488* (2013.01); *G06F 3/04817* (2013.01); *G06F 17/30056* (2013.01)

(58) Field of Classification Search
CPC .............................. G06F 3/0481; G06F 3/0482
USPC ........................................................ 715/823
See application file for complete search history.

(56) References Cited

U.S. PATENT DOCUMENTS

| 7,752,184 B2 * | 7/2010 | Kagawa | G06F 17/30994 382/130 |
| 8,201,104 B2 * | 6/2012 | Yamamoto | A63F 13/10 348/E5.105 |
| 2005/0210410 A1 * | 9/2005 | Ohwa et al. | 715/821 |
| 2006/0236251 A1 * | 10/2006 | Kataoka | G06F 3/0481 715/757 |
| 2007/0214169 A1 * | 9/2007 | Audet | G06F 17/2205 |
| 2008/0016446 A1 * | 1/2008 | Aonuma | G06F 3/0482 715/733 |
| 2008/0120572 A1 * | 5/2008 | Bahn | G06F 3/0482 715/810 |
| 2008/0250312 A1 * | 10/2008 | Curtis | G06Q 10/00 715/700 |
| 2009/0007018 A1 * | 1/2009 | Ikeda | G06F 17/3028 715/838 |
| 2010/0042684 A1 * | 2/2010 | Broms | G06Q 10/10 709/204 |
| 2011/0055762 A1 * | 3/2011 | Jung | G06F 3/0481 715/835 |
| 2011/0066627 A1 * | 3/2011 | Seung et al. | 707/758 |
| 2011/0102421 A1 * | 5/2011 | Minamino | G06F 3/04815 345/419 |
| 2011/0320483 A1 * | 12/2011 | Kim | G06F 17/30023 707/769 |
| 2012/0079428 A1 * | 3/2012 | Audet | G06F 17/2205 715/825 |
| 2014/0149941 A1 * | 5/2014 | Ikeda | G06F 17/3028 715/838 |
| 2015/0113480 A1 * | 4/2015 | Krikke | G06F 9/4443 715/830 |

FOREIGN PATENT DOCUMENTS

JP 2006-301872 11/2006
KR 1020110028877 3/2011

* cited by examiner

*Primary Examiner* — Reza Nabi
*Assistant Examiner* — Daniel Rodriguez
(74) *Attorney, Agent, or Firm* — Staas & Halsey LLP

(57) ABSTRACT

A method of providing a UI and a display apparatus applying the same include the operations of selecting a main thumbnail, searching thumbnails related to the main thumbnail on a basis of the main thumbnail, and displaying the selected main thumbnail and the searched thumbnails on radial axes according to a preset arrangement criterion.

22 Claims, 11 Drawing Sheets

APPARATUS AND METHOD OF PROVIDING USER INTERFACE

CROSS-REFERENCE TO RELATED APPLICATIONS

This application claims priority under 35 U.S.C. §119 from Korean Patent Application No. 10-2011-0126382, filed on Nov. 29, 2011, in the Korean Intellectual Property Office, which is incorporated herein by reference in its entirety.

BACKGROUND

1. Field

The general inventive concept relates to a method of providing a user interface (UI) and a display apparatus therefor, and more particularly, to a method of providing a UI which searches for a desired image among a plurality of images and a display apparatus therefor.

2. Description of the Related Art

A display apparatus has been improved to have a large storage capacity to store a large number of images therein.

When a large number of images are stored in a display apparatus, it takes a considerable amount of time for a user to search for a desired image from the stored images. In addition, even when the desired image is searched, the user has to perform a further search on the images stored in the display apparatus through a number of operations to search for other images related to the searched desired image. Thus, it is necessary to provide a user with a simple method of searching for images in a display apparatus.

SUMMARY

One and/or more exemplary embodiments of the present general inventive concept are provided with respect to a method of providing a UI, and a display apparatus applying the same, which search for thumbnail images related to a main thumbnail image while searching for the main thumbnail according to an operation command with respect to any one among radial axes sharing the main thumbnail.

Additional features and utilities of the present general inventive concept will be set forth in part in the description which follows and, in part, will be obvious from the description, or may be learned by practice of the present general inventive concept.

The foregoing and/or other features and utilities of the present general inventive concept may be achieved by a method of providing a UI. The method may include: selecting a main thumb nail, searching thumbnails related to the main thumbnail on the basis of the main thumbnail, and displaying the selected main thumbnail and the searched thumbnails on radial axes according to a preset arrangement criterion.

The method may further include receiving an operation command with respect to at least one axis among the radial axes and searching thumbnails related to a changed main thumbnail when the received operation command is a change command of the main thumbnail.

The radial axes may be axes which are classified according to any one category among a time, a face, a location and a continuous shooting relation. A number of the radial axes may be changeable.

The main thumbnail may be disposed in a region in which the radial axes cross each other.

The method may further include receiving an axis separation command, and displaying thumbnails on a radial axis corresponding to the axis separation command in a separate screen area.

The method may further include receiving an axis addition command, and displaying thumbnails corresponding to the axis addition command on a radial axis corresponding to the axis addition command.

The method may further, after any one of the radial axes is selected, include receiving a category change command, and changing the selected axis from a first category to a second category according to the received category change command.

The second category may be a sub-category of the first category.

The method may further, when the searched thumbnails are selected, include displaying images corresponding to the selected thumbnails.

The foregoing and/or other features and utilities of the present general inventive concept may also be achieved by providing a display apparatus. The display apparatus may include a storage unit configured to store a plurality of images, an operation unit configured to receive an operation command, and a control unit configured to search one and/or more thumbnail images related to a selected thumbnail image on the basis of the selected thumbnail image and display the selected main thumbnail image and the searched thumbnail image on the radial axes according to the preset arrangement criterion.

The operation unit may receive an operation command with respect to at least one among a plurality of thumbnail axes sharing the main thumbnail. The control unit may search thumbnails related to a changed main thumbnail when a received operation command is a change command with respect to the main thumbnail.

The control unit may classify the radial axes into axes corresponding to any one category among a time, a face, a location, and a relation, and a number of the radial axes is changeable.

The main thumbnail may be positioned in a region in which the radial axes cross each other.

The operation unit may receive an axis separation command with respect to separating at least one from the radial axes, and the control unit may control thumbnails corresponding to the axis separation command on the radial axes to be displayed on a separation screen area.

The operation unit may receive an axis addition command, and the control unit may control thumbnails corresponding to the axis addition command to be displayed on the radial axes.

The operation unit may receive a category change command after any one is selected among the plurality of thumbnail axes, and the control unit may control an axis of the selected thumbnail axis to be changed from a first category to a second category according to the received category change command.

The second category may be a sub-category of the first category.

The control unit may control an image corresponding to a selected thumbnail to be displayed when one of a plurality of thumbnails displayed is selected.

In an exemplary embodiment, a display apparatus may include an allocation unit to allocate each of a plurality of thumbnails to categories associated with respective radial axes, a first search unit to select a main thumbnail and simultaneously search the main thumbnail and the plurality of thumbnails on a basis of the main thumbnail and a preset criterion, and a display unit to display, on a first axis of the user interface, images of the main thumbnail and thumbnails obtained by searching the plurality of thumbnails using the main thumbnail and the preset criterion, so that the image of the main thumbnail is displayed in a region in which the radial axes cross each other.

In an exemplary embodiment, the display apparatus may include a second search unit to search at least a first sub-category thumbnail of a first category thumbnail.

In still another exemplary embodiment, images of thumbnails obtained in the at least first sub-category may be displayed on a second axis of the user interface, and an image of the first category thumbnail may be displayed in a region in which the first radial axis crosses the second axis.

In an exemplary embodiment, a display apparatus may include a display apparatus that includes a display unit having a touchscreen that senses a touching operation and a control unit in electrical communication with the display unit. The control unit may search a selected main thumbnail and first thumbnails arranged along a first selected radial axis and, in response to a touching operation, search a second selected radial axis having the selected main thumbnail and second thumbnails different from the first thumbnails arranged therealong. Further, the display unit may display the selected main thumbnail, the searched first thumbnails along the first selected radial axis and the searched second thumbnails along the second selected radial axis so that an image of the main thumbnail is displayed in a region where the first and second radial axes cross each other.

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
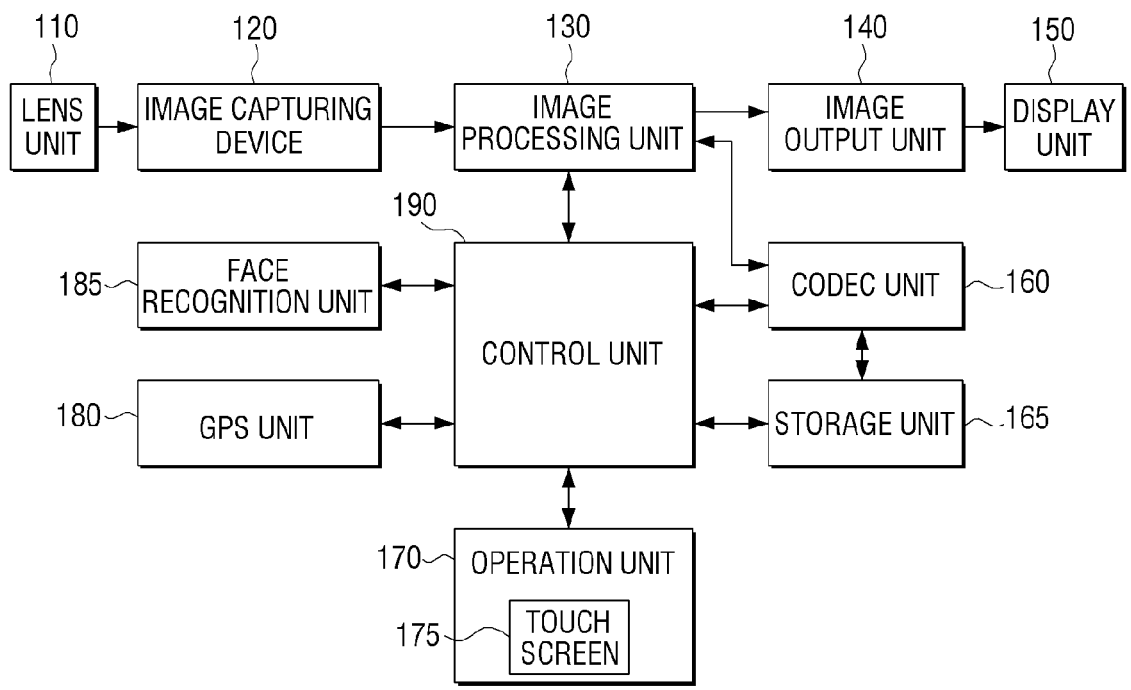
FIG. 1 is a block diagram illustrating a camera apparatus according to an exemplary embodiment of the present general inventive concept.

Reference will now be made in detail to the exemplary embodiments of the present general inventive concept, examples of which are illustrated in the accompanying drawings, wherein like reference numerals refer to the like elements throughout. The exemplary embodiments are described below to explain the present general inventive concept while referring to the figures.

The matters defined in the description, such as detailed construction and elements, are provided to assist in a comprehensive understanding of the exemplary embodiments. Thus, it is apparent that the exemplary embodiments may be carried out without those specifically defined matters. Also, functions and/or elements known in the related art are not described in detail since the exemplary embodiments would be obscured with unnecessary detail.

FIG. 1 is a block diagram illustrating an image capturing apparatus 100 according to an exemplary embodiment of the present general inventive concept. As illustrated in FIG. 1, the image capturing apparatus 100 includes a lens unit 110, an image capturing device 120, an image processing unit 130, an image output unit 140, a display unit 150, a codec unit 160, a storage unit 165, an operation unit 170, a global positioning system (GPS) unit 180, a face recognition unit 185, and a control unit 190.

The lens unit 110 collects light from an object to form an optical image in a capturing area.

The image capturing device 120 converts the light corresponding to the optical image incident from a lens of the lens unit 110 into an electric signal and performs a predetermined signal processing function on the electric signal. The image capturing device 120 may perform the above-described function on pixels of the optical image and may have an analog to digital (AD) converter. Each of the pixels outputs an analog image signal, and the AD converter converts the analog image signal into a digital image signal and output the digital image signal as a captured image.

The image processing unit 130 performs a signal processing function on the captured image input from the image capturing device 120 and transmits an image signal in which the captured image is processed to the image output unit 140 to be displayed on the display unit 150. In addition, the image processing unit 130 performs signal processing on an image input from the control unit 190 and outputs an image signal in which the image is processed to display a stored image and an image search menu to the image output unit 140.

Here, the image search menu denotes a graphic user interface (GUI) which is provided to allow a user to select a desired image among images stored in the storage unit 165. The image search menu may be in any one of a thumbnail view mode and a single view mode.

The image search menu of the thumbnail view mode may be configured to cause thumbnails with respect to a plurality of images to be displayed on one or more radial axes $A_1$-$A_4$ in a screen with a main thumbnail 410 as the center on the basis of the main thumbnail. That is, one or more axes $A_1$-$A_4$ may extend radially from a main thumbnail 410 located at a center of the screen. In addition, the image search menu may be configured of a form in which the thumbnails are displayed on X-axis, Y-axis, and Z-axis directions within a three-dimensional (3D) space on the screen.

The main thumbnail 410 is a thumbnail positioned at a point in which the radial axes cross each other. The main thumbnail represents a currently searched thumbnail by a user. The radial axes $A_1$-$A_4$ may share the main thumbnail 410 and be configured of different categories, respectively. Here, the category denotes a criterion with respect to classifying images of thumbnails included in a corresponding axis corresponding with a respective axis $A_1$-$A_4$.

Specifically, the category may be at least one of kinds of times, faces, locations, and relations. For example, the image search menu may be a form in which thumbnails of images arranged with a time-based category (that is, arranged in an order of a time when the images are captured) are displayed in a time-axis direction, thumbnails of images arranged with a face-based category (that is, arranged in an order of faces included in photographs) are displayed in a face-axis direction, thumbnails of images arranged on the basis of a location as a classification criterion (that is, arranged in an order of locations in which the photographs are captured) are displayed in a location-axis direction, and thumbnails of images arranged on the basis of a relation as a classification criterion (that is, arranged based on a continuous shooting relation between photographs) are displayed in a relation-axis direction.

The image search menu of a single view mode may be configured of a form in which only currently searched images among images to be searched are displayed.

As described above, the image processing unit 130 transmits an image signal processed to display the image search menu to the image output unit 140.

In addition, the image processing unit 130 outputs the processed image signal to the codec unit 160 to store the captured image. Specifically, the image processing unit 130 performs format conversion with respect to the image signal output from the image capturing device 120, a digital zoom to adjust an image scale, an auto white balance (AWB), an auto focus (AF), an auto exposure (AE), or the like.

The image processing unit 130 receives and process the images stored in the storage unit 165 through the codec unit 160. The image processing unit 130 outputs images of processed contents to the image output unit 140.

The image output unit 140 outputs the image signal received from the image processing unit 130 to the display unit 150 in the image capturing apparatus and/or an external output terminal.

The display unit 150 displays the captured image on a screen. In addition, the display unit 150 displays the image search menu. The display unit 150 may display the image search menu in a thumbnail view mode and/or a single view mode.

The codec unit 160 encodes the image received from the image processing unit 130. Then, the codec unit 160 transmits the encoded image to the storage unit 165. In addition, the codec unit 160 decodes the images stored in the storage unit 165. Then, the codec unit 160 transmits the decoded image signal to the image processing unit 130.

That is, when the captured image is stored, the codec 160 encodes the captured image and when the images stored is output to the image processing unit 130, the codec unit 160 decodes the stored images.

The storage unit 165 stores the image captured in the image capturing device 120 in a compressed manner. The storage unit 165 stores image-captured time information and image-captured location information with respect to the captured images along with the captured image. Here, the location information is generated based on position information using the GPS unit 180 and is information including at least one among a GPS coordinate, an address, and a location name with respect to each of the captured locations.

The storage unit 165 may be implemented by a flash memory, a hard disc, or the like.

The operation unit 170 receives a command through an operation of a user. Specifically, the operation unit 170 receives an operation of the user with respect to any one among radial axes (for example, left and right directions, up and down directions, and diagonal directions) with a main thumbnail as the center.

The operation unit 170 may be implemented in a button type on a surface of the image capturing apparatus 100. Alternatively, the operation unit 170 may be implemented in a type of a touch screen 175 configured to recognize a touch operation of a user on the display unit 150.

The GPS unit 180 detects coordinate information with respect to a current position using a satellite. The control unit 190 causes location information to correspond to images captured using the GPS unit 180.

The face recognition unit 185 performs a facial recognition function to recognize a face of a person. Specifically, the face recognition unit 185 performs a process of detecting the face of an image and a process of recognizing feature data of the face to perform a facial recognition function. The process of detecting the face is a process of detecting a region in which the face of the image is included. The process of recognizing feature data of the face is a process of recognizing a feature of the face to distinguish the face from the other faces.

The process of detecting the face is performed through color-based facial area detection, edge-based eye area detection, facial area normalization, and support vector machine (SVM)-based facial area verification.

The process of the color-based facial area detection is a process of detecting a face from an input image using skin color information of a face. Specifically, the process of the color-based facial area detection generates a flesh-colored filter using YCbCr information of the input image to extract a facial area. That is, the process of the color-based facial area detection is a process of extracting only a fleshed-colored portion from the input image.

The process of the edge-based eye area detection is a process of detecting an eye area using brightness information. In general, an eye area may be readily separated, but it is likely to generate an error due to various hair styles of women and/or glasses.

Then, the facial area is normalized using the detected eye and the normalized facial area is verified using SVM. When an SVM facial area verifier is used, the probability of erroneous detection of the facial area is reduced to less than 1%.

The facial recognition unit 185 detects the face from the image through the above-described processes.

Meanwhile, other facial recognition processes may be used, including, but not limited to a holistic approach method and an analytic approach method.

The holistic approach method of recognizing a face by taking the property of an overall area of a facial pattern into consideration. There are an Eigenface technique, a template matching-based technique, and the like as the holistic approach method.

The analytic approach method is a method of recognizing a face by extracting a geometric feature of the face. The analytic approach method has a fast recognition speed and requires a memory of a small capacity.

The method of recognizing feature data of a face includes the following processes. First, the face recognition unit 185 receives an image including a face. The face recognition unit 185 extracts components of the face (for example, eyes, a nose, a mouth, and the like). Next, the face recognition unit 185 performs correction when the face is rotated and/or an illumination is radiated into the face. The face recognition unit 185 may extract the feature of the face included in the image and detect the face of a person from the image through the above-described process.

As a result, the face recognition unit 185 may detect an overall pattern of the face from the image and recognize the feature data of the face included in the image using the detected facial pattern. The face recognition unit 185 provides a facial recognition function.

The control unit 190 controls an overall operation of the image capturing apparatus 100. The control unit 190 may move a main thumbnail to a direction of one axis among radial axes according to an input operation command to search images related to the main thumbnail.

Specifically, when a radial axis among the radial axes is selected by a user, the control unit 190 receives the operation command with respect to the direction of the selected axis and searches the images related to the main thumbnail while moving thumbnails according to the input operation command.

Here, the radial axes share the main thumbnail at the center thereof and are radially extended with the main thumbnail as the center. In other exemplary embodiments, the radial axes may be mixed radial axes including an X-axis, a Y-axis, a Z-axis, and a separate fourth axis radially represented in a 3D space. The radial axes may be modified in various manners.

In addition, the user may select a specific axis among the radial axes and move the main thumbnail to a direction of the selected specific axis, as discussed in greater detail below. Therefore, the operation direction may be up and down directions, left and right directions, and diagonal directions on the basis of a screen according to the selected axis-direction.

Here, the radial axes may be configured of different categories from each other and the categories may be classification criteria. The category may be classified into a first category and a sub-category.

In one embodiment, a touch operation may select an axis in a clockwise direction, and a second touch operation may select the axis in a counterclockwise direction. In another exemplary embodiment, a region at which the touch operation is performed on the screen controls the selection direction of the axis. In still another exemplary embodiment, a touching operation may be applied to a particular axis to perform the selection. For example, a user may touch the location axis to select the location category. Thereafter, the user may touch the relation axis to select the relation category that corresponds to that axis.

A selected axis may be emphasized with respect to the remaining axes. The emphasis used may include, but is not limited to, highlighting the selected axis, changing the selected axis, changing the color of the selected axis, etc.

For example, the first category may be each one among kinds of times, faces, locations, and relations. The sub-category may be each one of years, seasons, months, weeks, days, and hours.

Specifically, when the category is a time, the control unit 190 arranges the time axis in an order of a time. For example, the one axis among the radial axes is a time axis, the thumbnails included in the time axis may be classified according to a time and arranged in ascending or descending order.

When the category is a face, the control unit 190 arranges face axes according to faces. At this time, among a plurality of images, images in which the faces recognized through the face recognition unit 185 are the same are arranged in the same face axis.

When the category is a location, the control unit 190 arranges images among the plurality of images in which position information detected by the GPS unit 180 are the same are in the same location axis.

When the category is a relation, the control unit 190 arranges images having a continuous shooting relation with a specific image among the plurality of images in the same relation axis.

Figure 5:
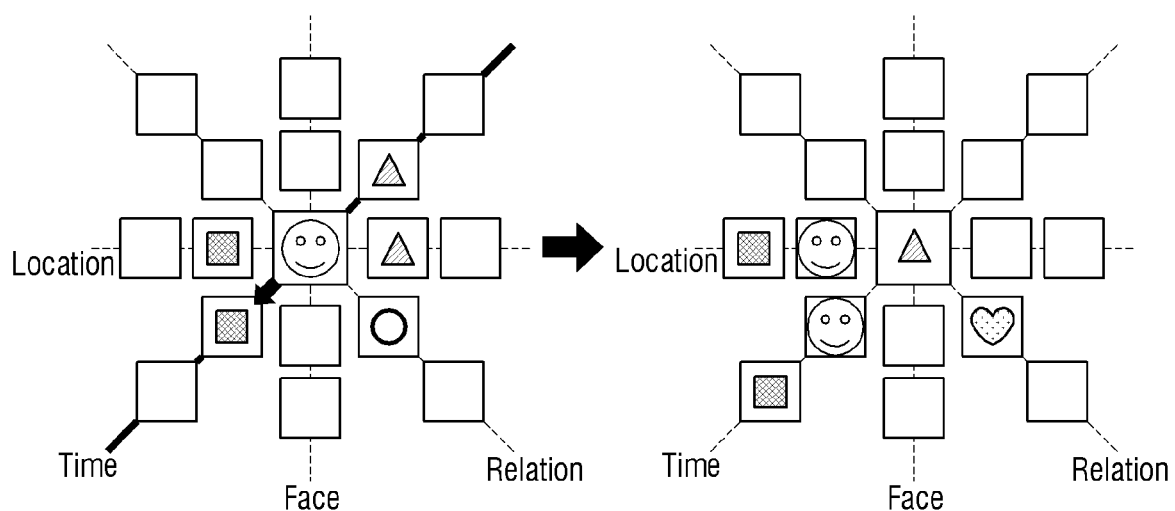
FIG. 5 is a view illustrating a screen in which a main thumbnail image moves according to an operation command with respect to a radial axis according to an exemplary embodiment of the present general inventive concept.

A particular touching of the screen, e.g., a gesture, may control the display of the thumbnail. A user's short stroke operation is an operation in which, in response to a user's touch or gesture, an image moves, e.g., to the left or to the left diagonal axis, in a distance which is less than a predetermined critical distance, for example, as shown in FIG. 5. For example, when a short stroke operation is input with respect to a selected axis direction by a user after a specific axis among the radial axes is selected, the control unit 190 moves a main thumbnail included in the selected axis according to the short stroke operation and searches a previous image and/or and next image related to the main thumbnail. The control unit 190 controls the searched images to be displayed.

In addition, when a long stroke operation, which is an operation in which, in response to a user's touch or gesture, an image moves, e.g., to the left or to the left diagonal axis, in a distance which is greater than a predetermined critical distance, is input with respect to the selected axis direction by the user, the control unit 190 searches images of a previous category or images of next category according to the long stroke operation. That is, the category of the selected axis may be changed from the first category to the sub-category according to the long stroke operation. The control unit 190 controls the searched images to be displayed.

Here, the stroke operation denotes an operation of completing touch after moving by a constant distance with a screen being touched by a user. The short stroke operation denotes an operation of completing touch after moving by a distance of less than a critical distance with the screen being touched by a user. The long stroke operation denotes an operation of completing touch after moving by a distance above a critical distance with the screen by a user. Here, the critical distance is a touch distance to determine whether the stroke operation is the long stroke or the short stroke.

The category denotes a group of thumbnails constituting a corresponding axis. For example, when the category of a specific axis is face, images according to the same face constitute the face axis. When the category is a time, images according to the same time constitute the time axis. When the category is a location, images according to the same locations constitutes the location axis. When the classification criterion is a relation, images according to a continuous shooting of the same face constitute the relation axis.

For example, an operation according to the stroke operation when the category of a first axis is a face will be described below. When the short stroke operation is input with respect to a first axis direction from the user, the control unit 190 searches a previous image and/or next image of the same face as the face of the main thumbnail currently displayed.

Meanwhile, when the category of the first axis is the face, if the long stroke operation is input with respect to the first axis direction, the control unit 190 searches images of a previous face and/or next face different from a face of a currently displayed image.

For example, when the category of a second axis is a location, if the short stroke operation is input with respect to a second axis direction, the control unit 190 searches a previous image and/or next image of the same location as a location of a currently displayed main thumbnail. When the category of the second axis is a location, if the long stroke operation is input with respect to the second axis direction, the control unit 190 may search images of a previous location and/or next location different from a location of a currently displayed image.

An operation of the case where the first axis and second axis are simultaneously configured of the one main thumbnail according to an exemplary embodiment will be described below. Specifically, when the first category of the first axis is a face and the first category of the second axis is a location, thumbnails classified based on the face are included in the first axis, and thumbnails classified based on the location are included in the second axis.

When the main thumbnail in which the first axis crosses the second axis is a thumbnail including an image of a person having a face A captured at a location of X, the short stroke operation is input with respect to the first axis direction by the user, a thumbnail (A, X) positioned in a main thumbnail area moves in a direction of the short stroke operation, and a thumbnail positioned in a new main thumbnail area becomes a thumbnail including an image of a person having the face A1 captured in a location of A. Here, the person having the face A1 is different from the person having the face A, and the image may be an image including the person having the face A and different persons.

When there are no images to be positioned in the main thumbnail and/or when the image is a last image in which a current main thumbnail is captured in a location X by continuous short stroke operations of the user, only thumbnails positioned in the main thumbnail move, and new thumbnails are not positioned in the main thumbnail area.

Meanwhile, the long stroke operation is input with respect to the first axis by the user, and the category of the first axis is converted from the first category to the sub-category. The category may be converted from the first category to the sub-category and/or from the sub-category to the first category by performing a touch operation through a predetermined manner other than the long stroke operation.

When a currently searched image is changed, the control unit 190 rearranges the radial axes based on the changed image. That is, the control unit 190 may always set an arrangement of thumbnails of categories based on the currently searched image.

That is, the control unit 190 controls the image search menu to be displayed in a thumbnail view mode. In other words, the control unit 190 controls an arrangement of thumbnails so that thumbnails of images classified into a first category are displayed in a first axis direction of a space on a screen, thumbnails of images classified into a second classification are displayed in a second axis direction of the space on the screen, and thumbnails of images classified into a n-th category are displayed in a n-th thumbnail axis of the space on the screen. Here, n may be modified in various numbers according to the type of the category set by the user. Four categories may be displayed on one screen. Four thumbnail axes may be displayed to share one main thumbnail. In at least one exemplary embodiment, each of the axes may be different from one another.

In addition, the control unit 190 may control the image search menu to be displayed in a single view mode. In other words, the control unit 190 may control only currently searched thumbnails among a plurality of thumbnails to be displayed on the screen.

Therefore, the control unit 190 may control images related to the main thumbnail according to n thumbnail axes. The exemplary embodiment has illustratively described the display apparatus including the camera, but a laptop computer including a cam, a camcorder having a display unit, a smart phone, and the like may be included in the display apparatus capable of applying the method of providing a UI of the present general inventive concept.

In addition, the exemplary embodiment has described that the image capturing apparatus includes the lens unit and the image capturing device, but the method of providing a UI according to the present general inventive concept may be applied to an apparatus without the lens unit and the image capturing device.

The exemplary embodiment has described that the image processing unit, the codec unit, and the control unit are separately configured, but the image processing unit, the codec unit, and the control unit may be implemented in one configuration. When the units are implemented of an integrated configuration, the units may perform the respective functions according to an internal logic configuration of the integrated configuration.

Therefore, the display apparatus according to the exemplary embodiment searches the main thumbnail arranged on the radial axes to simultaneously search thumbnails related to the main thumbnail by the user, thereby simplifying searching an image.

Figure 2:
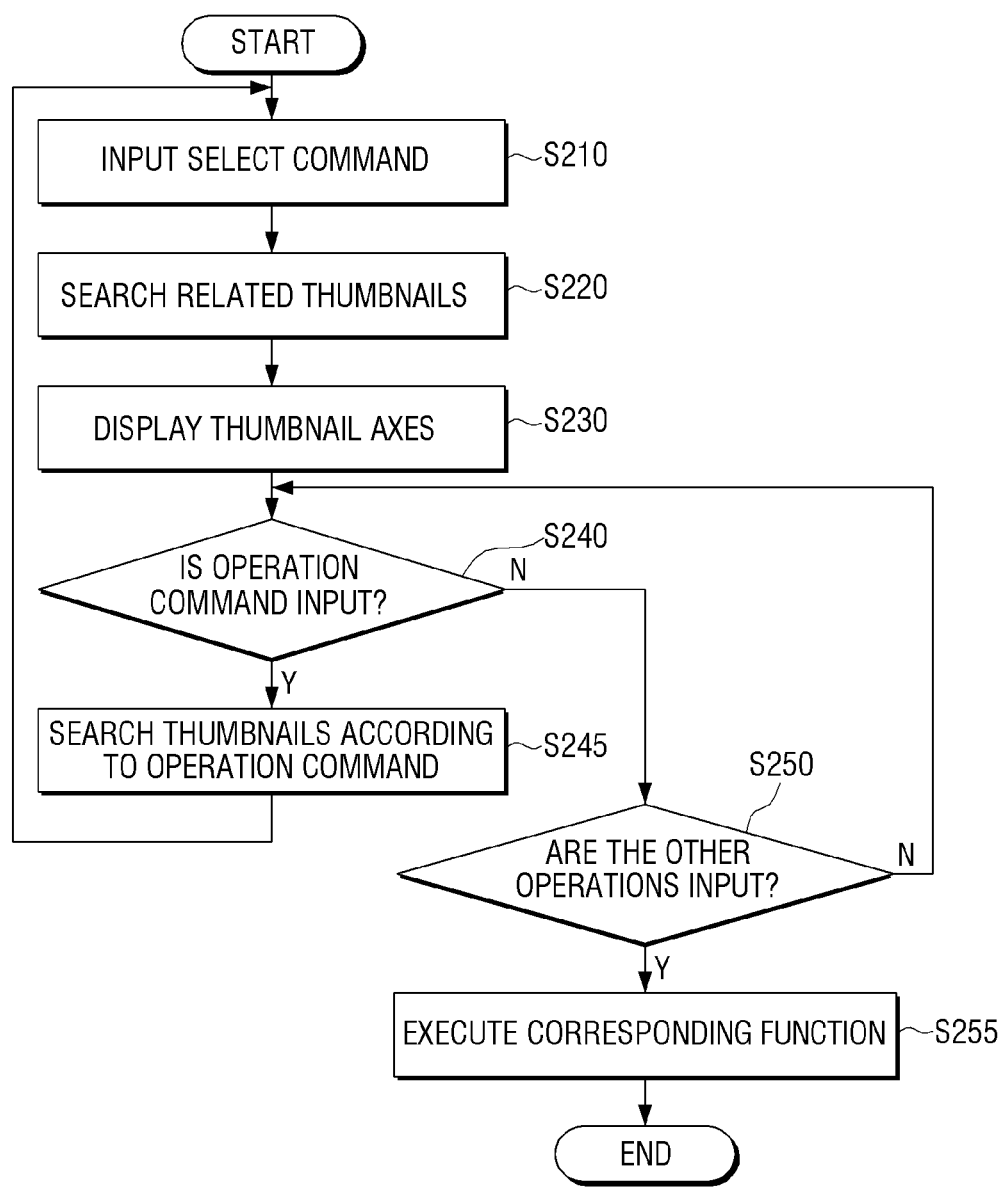
FIG. 2 is a flowchart illustrating a method of providing a UI according to an exemplary embodiment of the present general inventive concept.

Hereinafter, a method is described which provides a UI which searches images with respect to the radial axes with reference to FIG. 2. FIG. 2 is a flowchart illustrating a method of providing a UI according to an exemplary embodiment.

A selection command of selecting a main thumbnail is received from the user (S210). Thumbnails related to the selected main thumbnail stored in the storage unit 165 based on the selected main thumbnail are searched (S220). The selected main thumbnail and the searched thumbnails are displayed on radial axes according to a preset arrangement criterion (S230). Specifically, the image capturing apparatus 100 shares the selected main thumbnail at the center and arranges a plurality of thumbnails related to the main thumbnail with the radial axes, thereby displaying the thumbnails in the image search menu.

Here, the image search menu denotes a GUI provided to select a desired image among images stored in the storage unit 165 by the user. The image search menu may be in the thumbnail view mode, the single view mode, and/or another selected mode.

The image search menu of the thumbnail view mode may be configured of a form in which thumbnails of a plurality of images are displayed in a first thumbnail axis direction, a second thumbnail axis direction, a third thumbnail axis direction, and a fourth thumbnail axis direction in a space of a screen. According to the other exemplary embodiments, thumbnails may be displayed in four thumbnail axes or more. The thumbnails of the first to fourth thumbnail axis directions are thumbnails of images configured of different categories from each other. Here, the categories denote criteria to classify the images.

Specifically, the category may be any one of times, faces, locations, and relations. For example, in the image search menu, thumbnails of images arranged with the category as a time (that is, arranged in an order of times when the images are captured) are displayed in the first thumbnail axis direction, thumbnails of images arranged with the category as a face (that is, arranged in an order of faces included in pictures) are displayed in the second thumbnail axis direction, thumbnails of images arranged with the category as a location (that is, arranged in an order of locations where the pictures are captured) are displayed in the third thumbnail axis direction, and thumbnails of images arranged with the category as a relation (that is, relations between an image of the main thumbnail and an image captured continuously to the image of the main thumbnail) are displayed in the fourth thumbnail axis direction.

The image search menu of the single view mode is configured in a form in which only currently searched images among images to be searched are displayed on a screen.

Whether an operation with respect to a thumbnail axis direction is input from the user (S240) is checked. When the operation with respect to the first thumbnail axis direction is input (S240-Y), a main thumbnail moves according to the operation with respect to the thumbnail axis direction, and thumbnails related to the main thumbnail are searched (S245). The main thumbnail selected by the user and the searched thumbnails are displayed on the radial axes according to a preset arrangement criterion (S230).

A process of an operation with respect to any one axis among the radial axes will now be described in detail. That is, when a short stroke operation with respect to the first axis is input, a main thumbnail of the first axis moves in one thumbnail unit. That is, while a previous thumbnail and/or next thumbnail related to the main thumbnail moves in a main thumbnail area, thumbnails included in the first axis are searched.

Meanwhile, when a long stroke operation with respect to the first axis is input, the category of the first axis is changed to a first category or a sub-category rather than a current category of the first axis, and then searched. For example, when the category of the first axis is a time, the thumbnails constituting the first axis are thumbnails including images contained in the second week of July. If the long stroke operation with respect to the first axis is input by the user, the category of the first axis may be changed so that the thumbnails of the first axis are configured of thumbnails including images contained in the first week and/or third week of July.

The short or long stroke operation is only one exemplary embodiment and movement between categories and movement between images may be implemented by other various touch operations.

When the other operations are input (S250-Y), functions corresponding to the other operations are performed (S255).

Through the above-described processes, images are searched according to the operation command of the radial axes. Therefore the user may search the images with various categories more easily.

Figure 3:
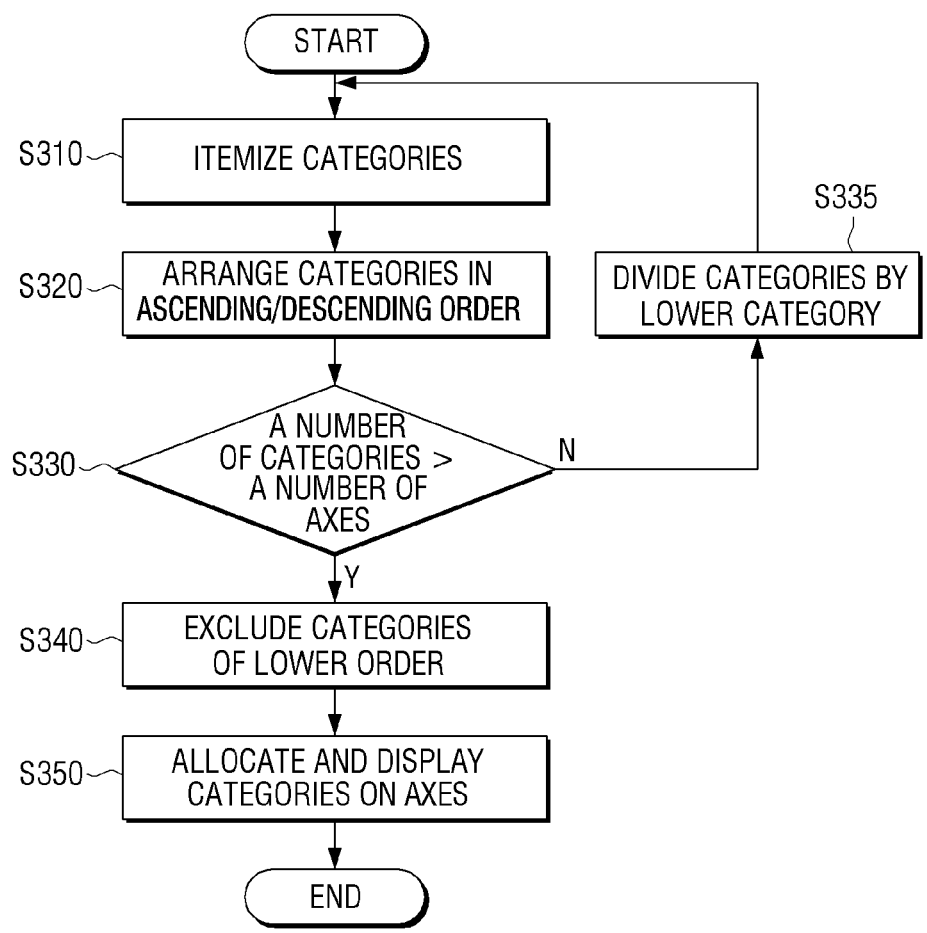
FIG. 3 is a flowchart illustrating a process of allocating categories on radial axes and displaying the categories according to an exemplary embodiment of the present general inventive concept.

FIG. 3 is a flowchart provided to explain a process of allocating categories to radial axes and displaying the categories according to an exemplary embodiment.

Referring to FIG. 3, first, an itemization of categories is performed (S310). An item corresponding to each specific category may be set as a basic value. Alternatively, the item corresponding to each specific category may be set by the user.

Here, the category may be classified into a first category and a sub-category constituting the first category. For example, the first category may be an item such as a time, a location, a face, a relation, and an event. In addition, new items may be added by the user.

The itemized categories may be arranged in an ascending or descending order (S320). A number of the itemized categories is compared with a number of the thumbnail axes displayed on a screen (S330). When the number of the categories is larger than the number of the thumbnail axes (S330-Y), categories of a sub-category are excluded from the item (S340). When the number of the categories is smaller than the number of the thumbnail axes, the categories are divided by the sub-category (S335).

Thumbnails grouped with respect to the categories are arranged on the radial axes and displayed on the screen in various types (S350).

Types of radial axes displayed on the screen will be described with reference to FIG. 4 to FIG. 9. Hereinafter, functions of the radial axes provided according to a touch operation of the image capturing apparatus 100 will be described in detail with reference to FIGS. 4 to 9.

Figure 4:
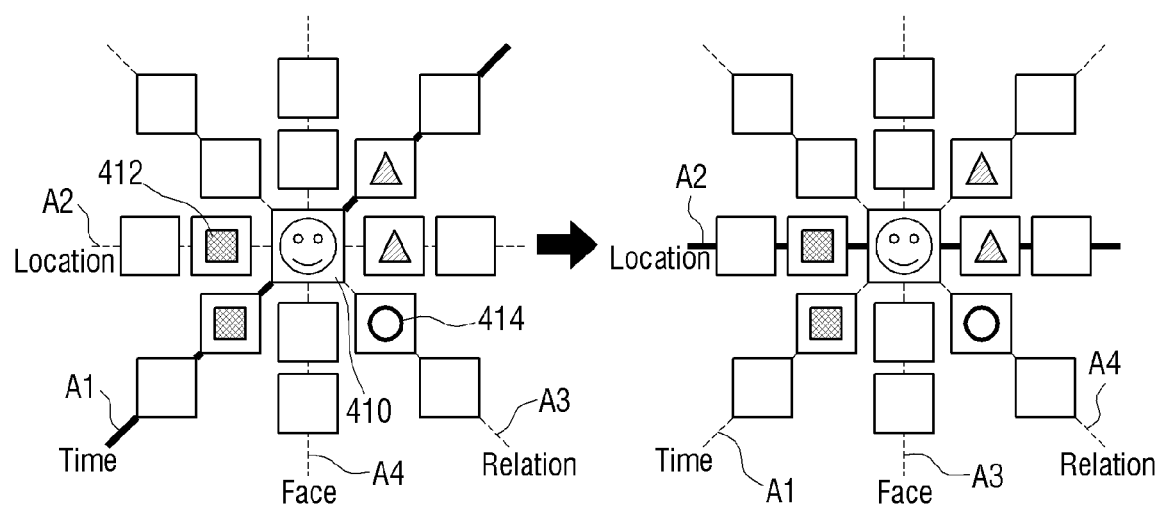
FIG. 4 is a view illustrating a screen in which a radial axis moves according to an exemplary embodiment of the present general inventive concept.

FIG. 4 is a view illustrating movement of radial axes according to an exemplary embodiment.

Referring to FIG. 4, four radial axes with respect to categories of a time, a location, a face, and a relation may be displayed on a screen. Thumbnails grouped into a corresponding category may be displayed on each axis. In the example on the left of FIG. 4, the diagonal axis is darker to indicate a selected axis. In the example on the right of FIG. 4, the horizontal axis is darker to indicate a selected axis. As noted above, a selected axis may be emphasized with respect to the remaining axes by, for example, highlighting the selected axis, enlarging the selected axis, changing the color of the selected axis, etc.

A main thumbnail 410 is positioned at a crossing point of the radial axes. The main thumbnail 410 indicates a thumbnail being currently searched. The thumbnails 412 and 414 positioned adjacent to the main thumbnail 410 are thumbnails related to the main thumbnail 410.

For example, the thumbnail 412 positioned in the left of the main thumbnail 410 in a location axis of FIG. 4 is a thumbnail including an image of the same face in the same location as the main thumbnail. The thumbnail 414 positioned below the right orthogonal is a thumbnail indicating an image of the same face having a continuous shooting relation with the main thumbnail.

A left drawing of FIG. 4 illustrates that the time axis is selected by the user and thumbnails of the time axis are displayed to be distinguished from the thumbnails on the other axes. In FIG. 4, the time axis is represented to be heavily displayed, e.g., emphasized, compared with the other axes.

In addition to the above-described manner, to allow the selected axis to be distinguished from the other axes, thumbnails of the selected axis may be largely and/or flickeringly displayed and/or displayed with a different color compared with the other axes. Further, a method of displaying the axis selected by the user may be implemented in various manners to be visually distinguished from the other axes.

The right drawing of FIG. 4 illustrates an exemplary embodiment in which an axis is changed from the time axis to the location axis by a user. The time axis may be selected by inputting an operation command with respect to selecting the time axis by the user and the axis is changed from the time axis to the location axis by inputting an operation command to select the location axis by the user. At this time, the user's operation command may be performed by performing a touch operation, e.g., a touching gesture, on a screen in which the location axis is displayed so that the change from the time axis to the location axis may be performed. The change from the time axis to the location axis may be performed using direction buttons disposed around a screen of the image capturing apparatus 100.

FIG. 5 is a view illustrating a screen in which a main thumbnail moves according to an operation command of radial axes with respect to an exemplary embodiment.

Referring to FIG. 5, a main thumbnail is positioned at a crossing point of the radial axes in the center thereof. The time axis including the main thumbnail is selected by the user and the time axis is represented to be distinguished from the other radial axes. A stroke operation command with respect to the time axis is input by the user. The stroke operation command is input in an arrow direction of the left drawing of FIG. 5. In the right drawing of FIG. 5, the main thumbnail moves downward to the left diagonal direction along the time axis according to the user's stroke operation command. In addition, a thumbnail including a previous triangular image is moved to a main thumbnail area.

Here, according to the user's short stroke operation, a rectangular image moves to the left and/or to the left diagonal axis in one unit and in the left drawing of FIG. 5, a circular image is excluded from the radial axes. A principle of excluding the circular image from the radial axes is as follows. The main thumbnail from a smile image to the triangular image is changed according to the user's short stroke operation and the thumbnail of a circular image is excluded in the right drawing of FIG. 5 because a thumbnail of the circular image does not have a continuous shooting relation with the triangular image. Meanwhile, the thumbnail of a heart image is included in the radial axes because a thumbnail of the heart image has a continuous shooting relation with the triangular image. Although smile and heart images are described, different shapes and/or indicators may be used.

The main thumbnail as shown in FIG. 5 moves along with thumbnails of images related to at least one among the location, the time, the face, and the relation. That is, while all thumbnails of images related to the main thumbnail move, even when moving only one axis including the main thumbnail, images may be readily searched.

Figure 6:
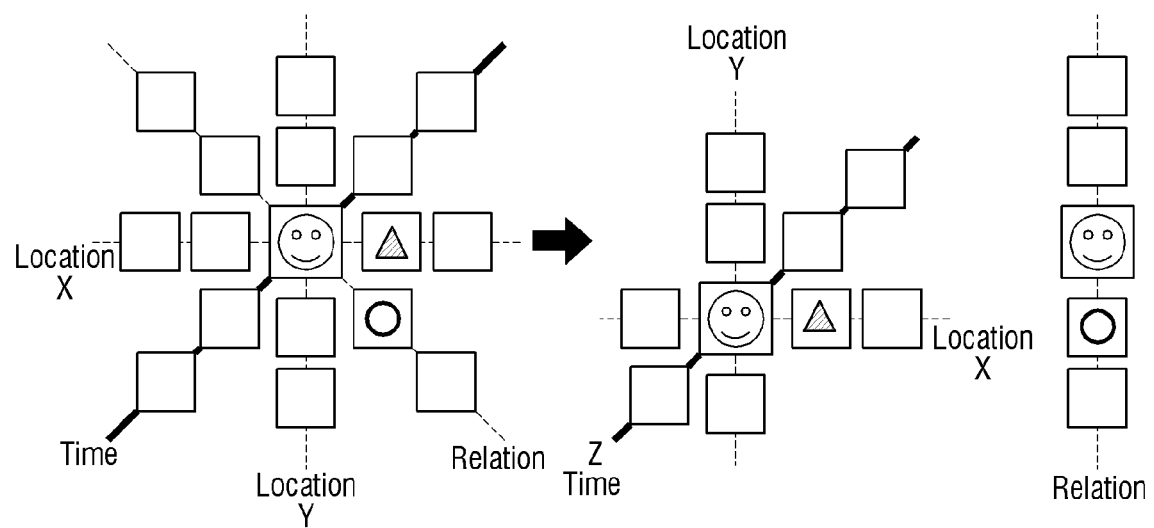
FIG. 6 is a view illustrating a screen to display thumbnail images in radial axes in another area according to a separation operation command with respect to an exemplary embodiment of the present general inventive concept.

FIG. 6 is a view illustrating a screen in which thumbnails placed on radial axes are displayed in the other regions according to a separation operation command.

Referring to FIG. 6, four radial axes are illustrated in the left drawing of FIG. 6. Three radial axes share a main thumbnail in the right drawing of FIG. 6, and thumbnails including the main thumbnail are vertically illustrated in the right area.

Even when any one axis among the radial axes is selected by the user (FIG. 6 illustrates that a time axis is selected), if the separation operation command of unselected radial axes (for example, a relation axis) is input by the user, the relation axis is separated according to the separation operation command, and thumbnails included in the separated radial axis may be displayed in a predetermined area of a screen.

Although the thumbnails are vertically arranged in the right area of the screen in FIG. 6, this is only one exemplary embodiment. Thumbnails included in the separated radial axis may be horizontally arranged or circularly arranged. Thumbnails included in the axis separated from the radial axes include the same thumbnail as the main thumbnail included in the radial axes. Therefore, as in described in FIG. 5, when an operation command with respect to moving the main thumbnail is input by the user, thumbnails related to the main thumbnail may move in the separated axis as well as in the radial axes according to movement of the main thumbnail.

Figure 7:
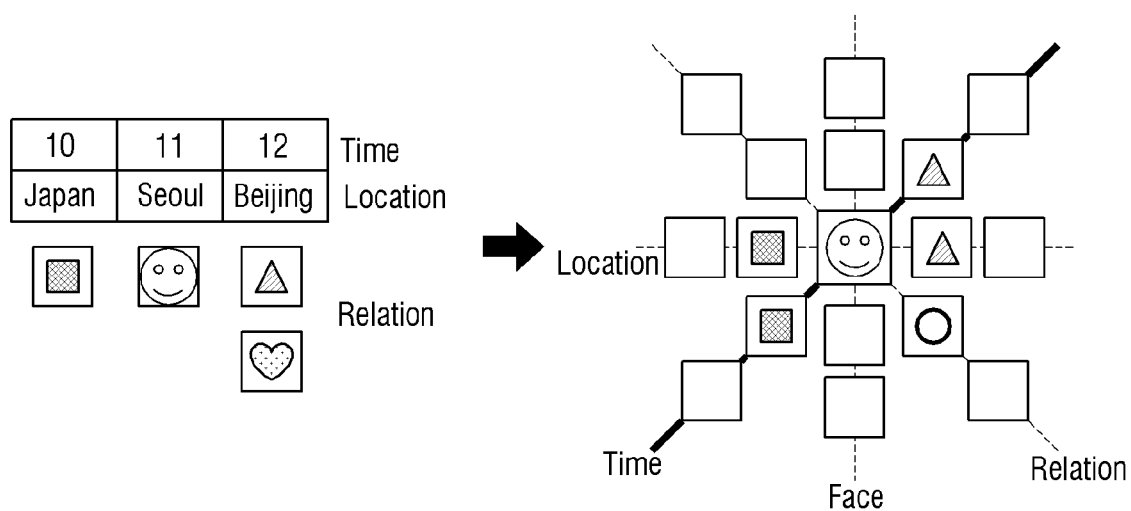
FIG. 7 is a view illustrating a screen to display images classified into a first category on radial axes as thumbnail images according to an exemplary embodiment of the present general inventive concept.

FIG. 7 is a view illustrating a screen in which images classified into a first category are displayed as thumbnails on the radial axes.

Referring to FIG. 7, the left drawing illustrates an image search menu of a table type classified from the first category into a sub-category, in general, and the right drawing of FIG. 7 illustrates image radial axes classified into the first category converted according to a conversion command from an image search menu of a table type to a radial image search menu.

The first category classified in FIG. 7 is classified into one or more categories, for example, four categories such as a time, a location, a face, and a relation. The four categories are allocated to the respective radial axes, and thumbnails including images classified into a corresponding category are included in the respective radial axes.

At this time, each of the radial axes is axis classified according to any one among the categories such as a time, a face, a location, and a continuous shooting relation and a number of the radial axes may be changed. An axis may be added to four radial axes.

Figure 8:
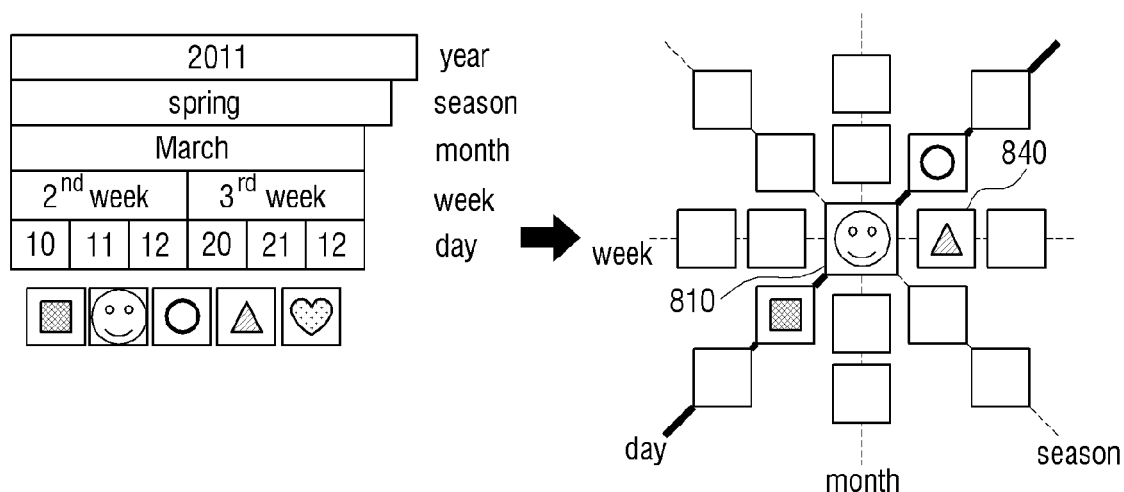
FIG. 8 is a view illustrating a screen to display images classified into a sub-category on radial axes as thumbnail images according to an exemplary embodiment of the present general inventive concept.

FIG. 8 illustrates a screen in which images classified into a sub-category are displayed on the radial axes as thumbnails according to an exemplary embodiment.

Referring to FIG. 8, the left drawing of FIG. 8 illustrates an image search menu of a table type in which a category of a first category (for example, a time) are classified in descending order. Thumbnails including images are included below a table.

For example, a plurality of thumbnails may be configured in a rectangular image thumbnail, a circular image thumbnail, a triangular image thumbnail, and a heart image thumbnail.

The radial axes are formed according to four categories in the right drawing of FIG. 8. A rectangular image thumbnail, a smile image thumbnail, a circular image thumbnail image, a triangular image thumb, and a heart image thumbnail are sequentially included in an order of a time on the time axis. The main thumbnail is a smile image thumbnail and a thumbnail including an image captured in the second week (an $11^{th}$ day) of March, spring of 2011. The rectangular image thumbnail on the time is a thumbnail including an image captured in the second week (a $10^{th}$ day) of March, spring of 2011. The circular image thumbnail is a thumbnail including an image captured in the second week (a $12^{th}$ day) of March, spring of 2011. The three thumbnails are arranged in an order of a time on the time axis.

On the other hand, a triangular image positioned in the left of the main thumbnail is a thumbnail including an image captured in the third week (a $20^{th}$ day) of March, spring of 2011. The triangular image thumbnail 840 has in common with the main thumbnail 810 that two thumbnails 840 and 810 are captured in the same month, but the captured week is different for each. Therefore, a week axis is an axis in which a plurality of thumbnails are arranged in an order of a week.

Although a heart image thumbnail is omitted in the right drawing of FIG. 8, this is due to the fact that the heart image thumbnail is contained in the same week as the triangular image thumbnail, but on a different day from the triangular image thumbnail. That is, the heart image thumbnail is an image captured on a 21st day of March, spring of 2011.

Although the heart image thumbnail is contained in a different week from the main thumbnail, the heart image thumbnail is contained in the same week as a triangular image thumbnail, and thus, the heart image thumbnail is not displayed in the week axis in the right drawing of FIG. 8.

When an operation command with respect to the week axis is input by the user and the triangular image thumbnail is positioned in the main thumbnail area, the heart image thumbnail is positioned in the right orthogonal of the main thumbnail image (the triangular image thumbnail). A heart image thumbnail is omitted in the drawing, but one of ordinary skill in the art may readily understand in view of the detailed description.

Figure 9:
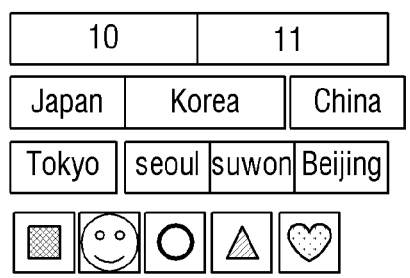
FIG. 9 is a view illustrating a screen display images where a first category and a sub-category mixed and classified on radial axes as thumbnail images according to an exemplary embodiment of the present general inventive concept.
Figure 9:
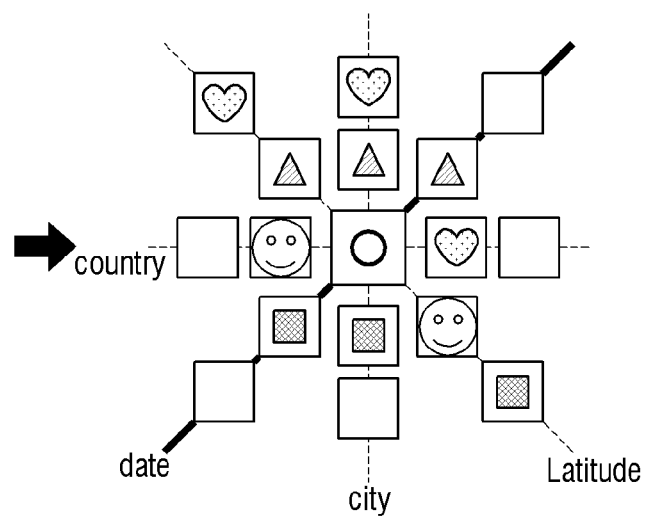

FIG. 9 is a view illustrating a screen in which images, in which a first category and a sub-category are mixed and classified, are displayed on radial axes as thumbnails.

Referring to FIG. 9, the left drawing of FIG. 9 illustrates an image search menu of a table type in which thumbnails are classified according to a time category and a location category. In the left drawing of FIG. 9, the time category is classified by the date and the location. The category is also classified by a country and a city, which is a sub-category of the country.

Thumbnails classified by the two categories may include a rectangular image thumbnail, a smile image thumbnail, a circular image thumbnail, a triangular image thumbnail, and a heart image thumbnail.

The drawing on the right of FIG. 9 illustrates radial axes configured on a country axis, a date axis, a city axis, and a latitude axis. Images contained in three country classifications (Japan, Korea, and China) are included on the country axis. That is, a smile image thumbnail, a circular image thumbnail, and a heart image thumbnail are included on the country axis.

A rectangular image thumbnail, a circular image thumbnail, and a triangular image thumbnail are included on the date axis. A rectangular image thumbnail, a circular image thumbnail, a triangular image thumbnail, and a heart image thumbnail are included on the city axis. A rectangular image thumbnail, a smile image thumbnail, a circular image thumbnail, a triangular image thumbnail, and a heart image thumbnail are included on the latitude axis.

The rectangular image thumbnail is a thumbnail including an image captured on a $10^{th}$ day in Tokyo, Japan, and the smile image thumbnail is a thumbnail including an image captured on a $10^{th}$ day in Tokyo, Japan. The circular image thumbnail is a thumbnail including an image captured on a $10^{th}$ day in Seoul, Korea; the triangular image thumbnail is a thumbnail including an image captured on a $11^{th}$ day in Suwon, Korea; and the heart image thumbnail is a thumbnail including an image captured on a $11^{th}$ day in Beijing, China.

When an operation command with respect to the date axis is input by the user, a main thumbnail (the circular image thumbnail) moves. The main thumbnail (the circular image thumbnail) is related to a previous thumbnail (a rectangular image thumbnail) and the next thumbnail (the triangular image thumbnail) on the city axis. The main thumbnail is related to a previous thumbnail (the smile image thumbnail) and the next thumbnail (the heart image thumbnail) on the country axis. The main thumbnail is related to a previous thumbnail (the smile image thumbnail) and the next thumbnail (the triangular image thumbnail) on the latitude axis.

When the main thumbnail moves and the triangular image thumbnail is positioned in the main thumbnail area, the main thumbnail (the triangular image thumb) is related to a previous thumbnail (the circular image thumbnail) and the next thumbnail (the heart image thumbnail) on the city axis. The main thumbnail (a triangular image thumbnail) is not related to a previous thumbnail (empty), and is related to the next thumbnail (the heart image thumbnail) on the country axis. The main thumbnail (the triangular image thumbnail) is related to a previous thumbnail (the circular image thumbnail) and the next thumbnail (the heart image thumbnail) on the date axis. The main thumbnail (the triangular image thumbnail) is related to a previous thumbnail (the circular image thumbnail) and the next thumbnail (the heart image thumbnail) on the latitude axis.

According to the exemplary embodiment, thumbnails classified with respect to categories are displayed on the radial axes so that while thumbnails are classified into a plurality of categories, searching images may be done through a simple operation in one screen. In addition, an operation command with respect to a specific axis among the radial axes is input and, while a main thumbnail corresponding to the operation command is searched, searching on the plurality of thumbnails related to the main thumbnail is simultaneously performed. Therefore, a UI interface with respect to easily searching the images through the simple operation is provided.

In addition, the above-described method of providing a UI may be implemented with at least one execution program to execute the method of providing a UI, and the execution program may be stored in a computer readable recording medium.

Figure 10:
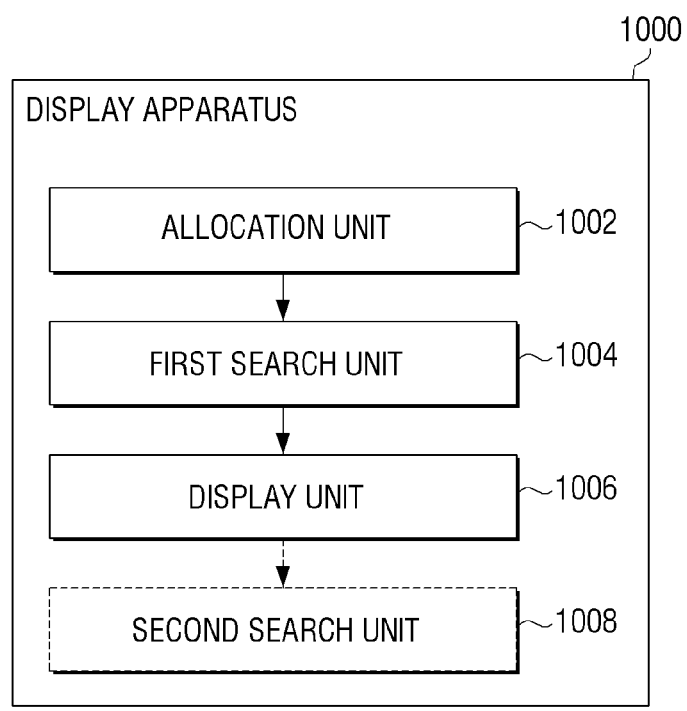
FIG. 10 is a block diagram illustrating a display apparatus in accordance with an exemplary embodiment of the present general inventive concept.

As illustrated in FIG. 10, in an exemplary embodiment, a display apparatus 1000 may include an allocation unit 1002 to allocate each of a plurality of thumbnails to categories associated with respective radial axes, a first search unit 1004 to select a main thumbnail and simultaneously search the main thumbnail and the plurality of thumbnails on a basis of the main thumbnail and a preset criterion. A display unit 1006 may display, on a first axis of the user interface, images of the main thumbnail and thumbnails obtained by searching the plurality of thumbnails using the main thumbnail and the preset criterion, so that the image of the main thumbnail is displayed in a region in which the radial axes cross each other. Additionally, the display apparatus 1000 may include a second search unit 1008 to search at least a first sub-category of a first category thumbnail, wherein images of thumbnails obtained in the at least first sub-category may be displayed on a second axis of the user interface, and an image of the first category thumbnail may be displayed in a region in which the first radial axis crosses the second axis.

Figure 11:
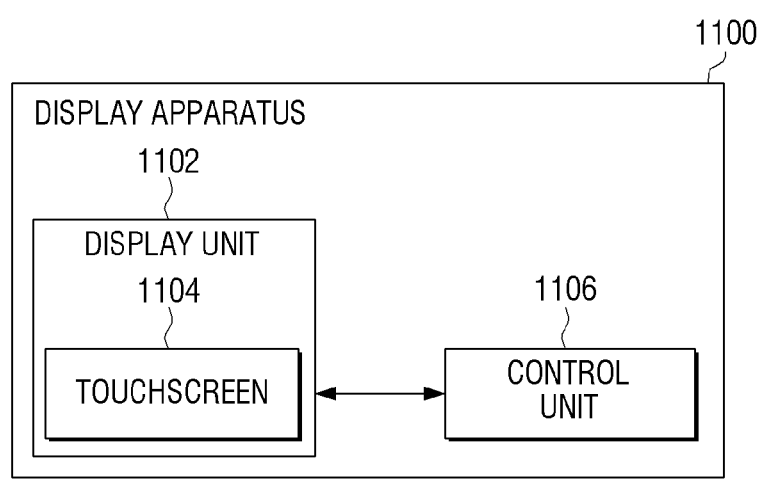
FIG. 11 is a block diagram illustrating a display apparatus in accordance with another exemplary embodiment of the present general inventive concept.

As illustrated in FIG. 11, in an exemplary embodiment, a display apparatus 1100 may include a display unit 1102 having a touchscreen 1104 that senses a touching operation and a control unit 1106 in electrical communication with the display unit 1102. The control unit 1106 may search a selected main thumbnail and first thumbnails arranged along a first selected radial axis and, in response to a touching operation, search a second selected radial axis having the selected main thumbnail and second thumbnails different from the first thumbnails arranged therealong. Further, the display unit 1102 may display the selected main thumbnail, the searched first thumbnails along the first selected radial axis and the searched second thumbnails along the second selected radial axis so that an image of the main thumbnail is displayed in a region where the first and second radial axes cross each other.

Therefore, each block of the exemplary embodiment may be performed with a computer recordable code on the computer readable recording medium. The computer readable recording medium may be a device in which data readable by a computer system is stored. The computer readable medium may include a computer readable recording medium and a computer-readable transmission medium. The computer readable recording medium is any data storage device that can store data as a program which can be thereafter read by a computer system. Examples of the computer readable recording medium include read-only memory (ROM), random-access memory (RAM), CD-ROMs, DVDs, magnetic tapes, floppy disks, and optical data storage devices. The computer readable recording medium can also be distributed over network coupled computer systems so that the computer readable code is stored and executed in a distributed fashion. The computer readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of providing a user interface (UI), comprising:
    selecting a main thumbnail;
    searching thumbnails related to the main thumbnail;
    displaying the searched thumbnails on radial axes according to a preset arrangement criterion, and displaying the main thumbnail at a center of the radial axes;
    receiving an axis separation command for a selected axis among the radial axes; and
    displaying, upon receiving the separation command, the searched thumbnails of the selected axis on a separate screen area from the radial axes and removing the searched thumbnails of the selected axis from the searched thumbnails on the radial axes so that the main thumbnail is displayed in the separate screen area and in the center of the radial axes.

2. The method as claimed in claim 1, further comprising:
    receiving an operation command with respect to at least one axis among the radial axes; and
    searching thumbnails related to a changed main thumbnail when the received operation command is a change command with respect to the main thumbnail.

3. The method as claimed in claim 1, wherein the radial axes are axes which are classified according to any one category among a time, a face, a location and a continuous shooting relation, and a number of the radial axes is changeable.

4. The method as claimed in claim 1, wherein the main thumbnail is disposed in a region in which the radial axes cross each other.

5. The method as claimed in claim 1, further comprising:
    receiving an axis addition command; and
    displaying thumbnails corresponding to the axis addition command on a radial axis corresponding to the axis addition command.

6. The method as claimed in claim 1, further comprising:
after anyone of the radial axes is selected,
    receiving a category change command; and
    changing the selected axis from a first category to a second category according to the received category change command.

7. The method as claimed in claim 1, further comprising, when the searched thumbnails are selected, displaying images corresponding to the selected thumbnails.

8. A display apparatus, comprising:
    a storage configured to store a plurality of images;
    an operator configured to receive an operation command;
    a display; and
    a controller configured to search thumbnails related to a selected main thumbnail and display the searched thumbnails on the radial axes according to a preset arrangement criterion, and display the selected main thumbnail at a center of the radial axes;
    wherein the operator receives an axis separation command for a selected axis among the radial axes to separate at least one axis from the radial axes, and the controller displays the searched thumbnails of the selected axis on a separate screen area from the radial axes and removes the searched thumbnails of the selected axis from the searched thumbnails on the radial axes so that the selected main thumbnail is displayed in the separate screen area and in the center of the radial axes.

9. The display apparatus as claimed in claim 8, wherein the operator receives an operation command with respect to at least one among a plurality of thumbnail axes sharing the selected main thumbnail, and
    the controller searches thumbnails related to a changed main thumbnail when a received operation command is a change command with respect to the selected main thumbnail.

10. The display apparatus as claimed in claim 8, wherein the controller classifies the radial axes into axes corresponding to any one category among a time, a face, a location, and a relation, and a number of the radial axes is changeable.

11. The display apparatus as claimed in claim 8, wherein the selected main thumbnail is positioned in a region in which the radial axes cross each other.

12. The display apparatus as claimed in claim 8, wherein the operator receives an axis addition command, and
    the controller controls thumbnails corresponding to the axis addition command to be displayed on the radial axes.

13. The display apparatus as claimed in claim 8, wherein the operator receives a category change command after any one thumbnail axis is selected among the plurality of thumbnail axes, and
    the controller controls an axis of the selected one thumbnail axis to be changed from a first category to a second category according to the received category change command.

14. The display apparatus as claimed in claim 13, wherein the second category is a sub-category of the first category.

15. The display apparatus as claimed in claim 8, wherein the controller controls an image corresponding to the selected main thumbnail to be displayed when one of a plurality of thumbnails displayed is selected.

16. A display apparatus comprising:
    an allocation unit to allocate each of a plurality of thumbnails to categories associated with respective radial axes;
    an operator configured to receive an operation command;
    a first search unit to select a main thumbnail and simultaneously search the main thumbnail and the plurality of thumbnails on a basis of the main thumbnail and a preset criterion; and
    a display to display, on a first axis of a user interface, images of the main thumbnail and thumbnails obtained by searching the plurality of thumbnails using the main thumbnail and the preset criterion, so that the image of the main thumbnail is displayed in a region where the radial axes cross each other,
    wherein the operator receives an axis separation command for a selected axis among the radial axes to separate the selected axis from the radial axes, and a controller displays thumbnails obtained by searching and displayed on the selected axis on a separate screen area from the radial axes and removes the thumbnails obtained by searching and displayed on the selected axis from the searched thumbnails on radial axes so that the main thumbnail is displayed in the separate screen area and in the region where the radial axes cross each other.

17. The display apparatus as claimed in claim 16, further including a second search unit to search at least a first sub-category of a first category thumbnail.

18. The display apparatus as claimed in claim 17, wherein images of thumbnails obtained in the at least first sub-category are displayed on a second axis of the user interface, and an image of the first category thumbnail is displayed in a region in which the first radial axis crosses the second axis.

19. A display apparatus comprising:
a display including a touchscreen that senses a touching operation; and
an operator configured to receive an operation command;
a controller in electrical communication with the display unit to search a selected main thumbnail and first thumbnails arranged along a first selected radial axis and, in response to the touching operation, to search a second selected radial axis having the selected main thumbnail and second thumbnails different from the first thumbnails arranged therealong,
wherein the display displays the selected main thumbnail, the searched first thumbnails along the first selected radial axis and the searched second thumbnails along the second selected radial axis so that an image of the selected main thumbnail is displayed in a region where the first selected radial axis and the second selected radial axis cross each other, and
wherein the operator receives an axis separation command for a selected separation axis among the first selected radial axis and the second selected radial axis to separate the selected separation axis from the first selected radial axis and the second selected radial axis, and the controller displays thumbnails of the selected separation axis on a separate screen area from the first selected radial axis and the second selected radial axis and removes thumbnails of the selected separation axis from the searched first thumbnails on the first selected radial axis or the searched second thumbnails on the second selected radial axis so that the main thumbnail is displayed in the separate screen area and in the region where the first selected radial as and the second selected radial axis previously crossed each other.

20. The display apparatus of claim 19, wherein an emphasis is applied to the first selected radial axis, and the emphasis is applied to the second selected radial axis in response to the touching operation.

21. The display apparatus of claim 20, wherein the emphasis includes at least one of a highlight, a greater size, and a color.

22. The method as claimed in claim 6, wherein the second category is a sub-category of the first category.

* * * * *